United States Patent [19]
Judic

[11] Patent Number: 6,129,420
[45] Date of Patent: Oct. 10, 2000

[54] ERGONOMIC VEHICLE SEAT

[75] Inventor: Jean-Marc Judic, Orsay, France

[73] Assignee: Bertrand Faure Equipments SA, Boulogne, France

[21] Appl. No.: 09/119,277

[22] Filed: Jul. 20, 1998

[30] Foreign Application Priority Data

Jul. 24, 1997 [FR] France ................... 97 09425

[51] Int. Cl.⁷ .................................................. B60N 2/00
[52] U.S. Cl. ............................................ 297/330; 297/340
[58] Field of Search ........................... 297/316, 317, 297/318, 322, 362.14, 362.13, 330, 341, 342, 340, 362.12, 362.11

[56] References Cited

U.S. PATENT DOCUMENTS

| | | |
|---|---|---|
| 2,497,395 | 2/1950 | Cramer, Sr. . |
| 3,874,480 | 4/1975 | Porter et al. .............................. 188/67 |
| 4,505,514 | 3/1985 | Stockl et al. . |
| 4,877,291 | 10/1989 | Taylor . |
| 5,145,232 | 9/1992 | Dal Monte . |

FOREIGN PATENT DOCUMENTS

| | | |
|---|---|---|
| 2 200 803 | 4/1974 | France . |
| 2437954 | 4/1980 | France . |
| 2 556 294 | 6/1985 | France . |
| 617 530 | 8/1935 | Germany . |
| 1 555 097 | 8/1970 | Germany . |
| 2754022 | 6/1978 | Germany ............................... 297/316 |
| 86 20 791 | 1/1987 | Germany . |
| 195 19 153 A1 | 12/1995 | Germany . |
| 931519 | 6/1982 | U.S.S.R. ................................ 297/318 |

OTHER PUBLICATIONS

French Preliminary Search Report dated Mar. 23, 1998, French Application FR 9709425.

Primary Examiner—Milton Nelson, Jr.
Attorney, Agent, or Firm—Marshall, O'Toole, Gerstein, Murray & Borun

[57] ABSTRACT

A vehicle seat comprises a base, a seat proper, and a seat back pivotally mounted on the base about an axis which is situated above the seat proper and in front of the seat back. The rear end of the seat proper is pivotally mounted on the seat back and the front end of the seat proper is mounted on the base via a linkage adapted to impose angular displacements on the seat proper that are less than half the angular displacements to which the seat back is subjected when the inclination of the seat back is adjusted.

8 Claims, 3 Drawing Sheets

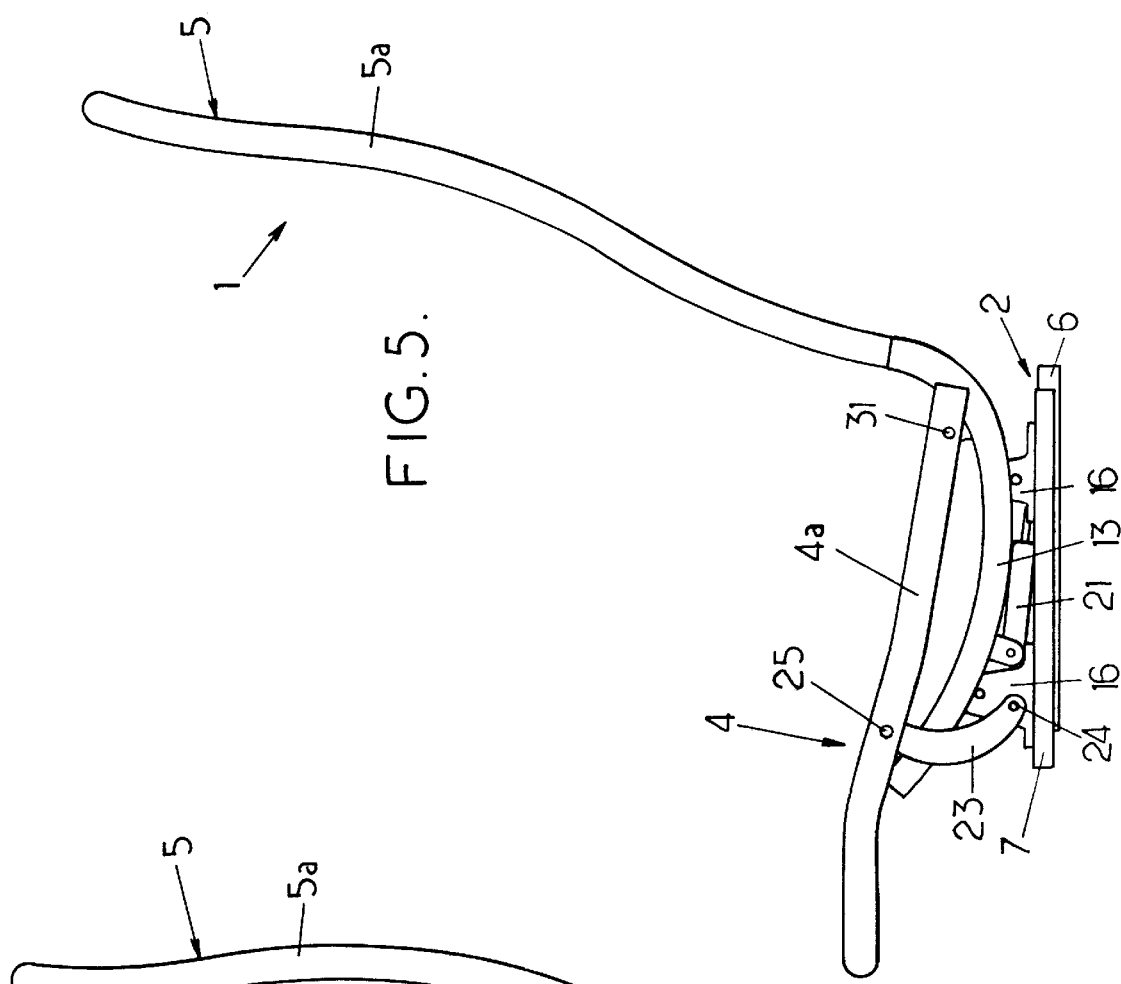

ERGONOMIC VEHICLE SEAT

FIELD OF THE INVENTION

The present invention relates to ergonomic vehicle seats.

More particularly, the invention relates to a vehicle seat comprising a base designed to be mounted on a floor of the vehicle, together with a seat proper and a seat back supported by the base, the seat back being pivotally mounted on the base to pivot about a transverse horizontal axis of rotation so that a user can adjust the inclination of said seat back with help of adjustment means, the seat proper extending between a front end and a rear end and having a top face for supporting the user, said seat proper having a mean plane which is substantially parallel to said top face, the seat back having a front face for supporting the user, and said seat back also having a mean plane which is substantially parallel to said front face, the seat having a longitudinal midplane which is perpendicular to the mean planes of the seat proper and of the seat back, the axis of rotation of the seat back being situated in front of the seat back at a first distance from the front face of said seat back as measured in the midplane of the seat parallel to the mean plane of the seat proper, and the axis of rotation of the seat back being situated above the seat proper, at a second distance from the top face of said seat proper as measured in the midplane of the seat parallel to the mean plane of the seat back.

In seats of that type, changing the inclination of the seat back corresponds to movements that are relatively ergonomic, and those movements apply relatively low forces on the adjustment means. In addition, those dispositions are also favorable from the point of view of seat strength, particularly in the event of an accident, insofar as the pivot torques to which the seat back is subject are then much smaller than in conventional seats where the axes of rotation of the seat back is situated at the back portion of the seat proper.

BACKGROUND OF THE INVENTION

Document FR-A-2 437 954 describes an example of a seat of the type mentioned above.

In that seat, because the bottom of the seat back is subjected to relatively large front to back horizontal displacement during adjustment of the inclination of the seat back, it is necessary for the seat proper to follow those movements, otherwise a gap can be created between the rear of the seat proper and the bottom of the seat back when the seat back is inclined relatively little, and/or the bottom of the seat back can encroach on the seat proper when the seat back is inclined backwards to a greater extent.

That is why, in that known seat, the seat proper is secured to the seat back so as to pivot together with the seat back about its axis of rotation.

However, assembling the seat proper in that way is relatively unergonomic insofar as it gives rise to large variations in the inclination of the seat proper as a function of the inclination to which the seat back is adjusted. These variations in the inclination of the seat proper can be troublesome for the user of the seat, particularly if the user is the driver of the vehicle, since the driver must have easy access to the control pedals of the vehicle. In many cases, the driver of the vehicle must therefore readjust the longitudinal position of the seat as a whole after adjusting the inclination of the seat back, and that can become irksome.

OBJECTS AND BRIEF SUMMARY OF THE INVENTION

A particular object of the present invention is to mitigate those drawbacks.

To this end, according to the invention, a seat of the kind in question is essentially characterized in that the rear end of the seat proper is pivotally mounted on an element secured to the seat back and is supported by said element, and in that the front end of the seat proper is mounted on the base via a linkage adapted to impose angular displacements on the seat proper that are less than half the angular displacements to which the seat back is subjected during adjustment of the inclination of said seat back. Further, the linkage comprises at least one rigid link having a first pivot connected to the base and a second pivot connected to the seat proper, wherein the second pivot is situated above the first pivot and wherein the first and second pivots are aligned on a direction that forms an angle of less than 20° relative to vertical.

By means of these dispositions, the seat is made considerably more ergonomic.

In preferred embodiments of the invention, use may optionally be made of one or more of the following dispositions:

- the linkage is adapted to impose angular displacements on the seat proper lying in the range 20% to 40% of the angular displacements to which the seat back is subjected during adjustment of the inclination of said seat back;
- the first distance lies in the range 3 cm to 25 cm and the second distance lies in the range 10 cm to 30 cm;
- the first distance lies in the range 8 cm to 20 cm and the second distance lies in the range 15 cm to 25 cm;
- the seat back has a rigid frame which is extended forwards and downwards by two circularly-arcuate curved bars, said curved bars extending on either side of the seat proper in vertical planes parallel to said midplane and each having a center of curvature situated on the axis of rotation of the seat back, and said curved bars slide longitudinally in guides belonging to the base to enable the seat back to pivot;
- the guides in which the curved bars slide comprise a plurality of pairs of wheels, the two wheels in each pair being disposed respectively above and below at least one rigid flange belonging to the corresponding curved bar and extending perpendicularly to the midplane of the seat;
- the adjustment means comprise a wormscrew which is driven by an electric motor and which meshes with a nut, one of said screw and said nut being connected to the base, and the other to the seat back; and
- the adjustment means comprise a rod associated with a locking device which is adapted to lock on the rod, one of said rod and said locking device being connected to the base, and the other to the seat back.

BRIEF DESCRIPTION OF THE DRAWINGS

Other characteristics and advantages of the invention appear from the following description of two embodiments given as non-limiting examples and with reference to the accompanying drawings.

In the drawings:

FIGS. 4 and 5 are side views of the FIG. 2 frame respectively with the seat back having small inclination and with the seat back having greater backward inclination.

MORE DETAILED DESCRIPTION

In the various figures, the same references designate elements that are identical or similar.

Figure 1:
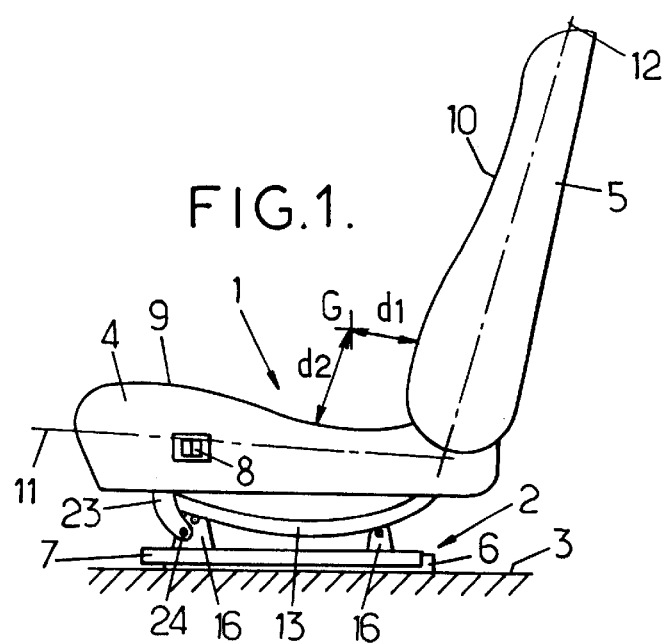
FIG. 1 is a diagrammatic view of a vehicle seat fitted with an adjustment device constituting a first embodiment of the invention.

FIG. 1 shows a vehicle seat 1, in particular a front seat of a motor vehicle, which seat comprises a base 2 mounted on the floor 3 of the vehicle, together with a seat proper 4 and a seat back 5 that are supported by the base 2.

In the example shown, the base 2 is constituted by two parallel slides, only one of which is visible in FIG. 1, serving to adjust the longitudinal position of the seat 1 as a whole. Each of the slides comprises a fixed bar 6 mounted on the floor 3, and a moving bar 7 which supports the seat proper 4 and the seat back 5.

The seat 1 also includes a device for adjusting the inclination of the seat back 5, which device may either be manual or motorized. In the example shown in FIG. 1, the adjustment device is motorized, and it is controlled by a control button 8 disposed on the side of the seat proper 4, for example.

The adjustment device in question, which is described in greater detail below, is adapted so that the seat back 5 does not pivot about its bottom end as in seats of the kind that is most widespread, but pivots about a transverse horizontal axis G which is situated substantially at the mean center of gravity of a user of the seat.

Figure 2:
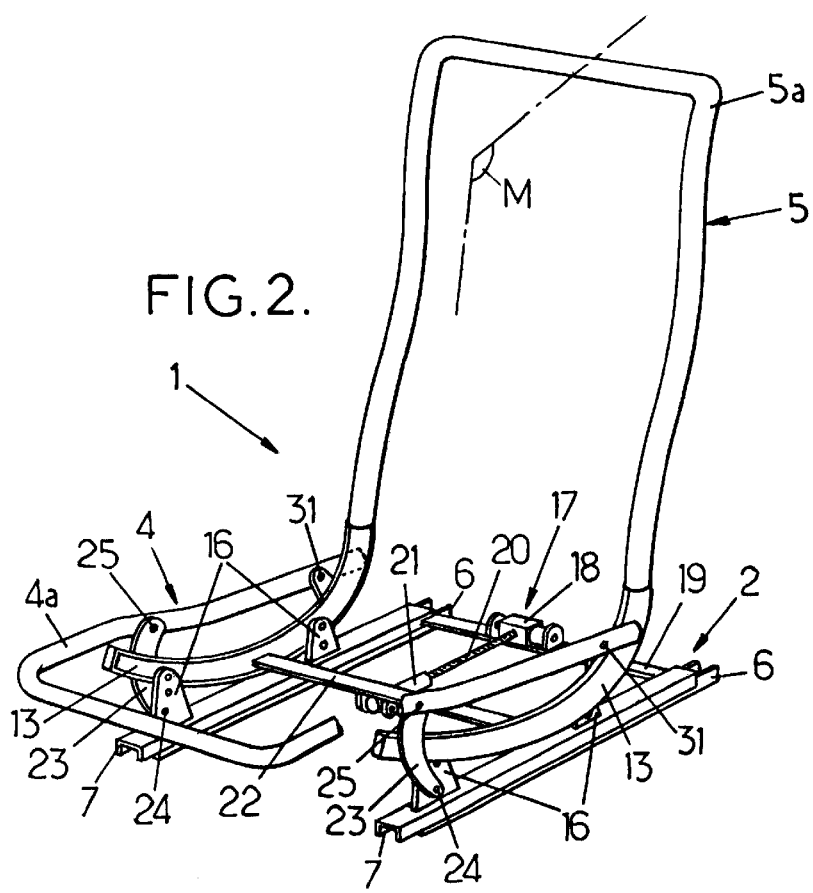
FIG. 2 is a perspective view of the frame of the FIG. 1 seat.

In any event, the axis G is situated, at least in the longitudinal midplane M of the seat 1, above the top face 9 of the seat proper 4 and in front of the front face 10 of the seat back 5 (see FIG. 2).

More precisely, in said longitudinal midplane of the seat, the axis G is situated at a first distance d1 from the front face 10 of the seat back (see FIG. 1), said distance d1 being measured parallel to the mean plane 11 of the seat proper, i.e. substantially parallel to the top face 9 of said seat proper, and said axis G is situated at a distance d2 above the top face 9 of the seat proper, said distance d2 being measured parallel to the mean plane 12 of the seat back, i.e. substantially parallel to the front face 10 of said seat back.

To make the seat 1 as ergonomic as possible, the first distance d1 generally lies in the range 3 cm to 25 cm, and preferably in the range 8 cm to 20 cm, while the second distance d2 generally lies in the range 10 cm to 30 cm, and preferably in the range 15 cm to 25 cm.

As shown in FIG. 2, in order to obtain the desired kinematics for the seat back 5, the rigid frame 5a of the seat back is extended downwards and forwards by two curved bars 13 each generally in the form of an arc of a circle.

Each of these curved bars extends in a vertical plane parallel to the longitudinal plane M of the seat, and each has a center of curvature situated on the above-mentioned axis of rotation G.

Figure 3:
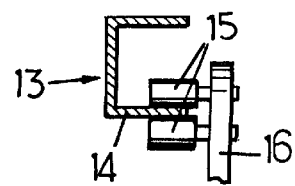
FIG. 3 shows a detail of the FIG. 2 frame.

In addition, each of the curved bars 13 is of a channel section that is open towards the inside of the seat, and as shown in FIG. 3, one of the horizontal flanges 14 of the channel section is guided between two pairs of wheels 15.

The two wheels 15 in each pair are rotatably mounted on a corresponding lug 16 secured to the moving bar 7 of the corresponding slide, with the two wheels running respectively on the top face and on the bottom face of the flange 14.

The seat 1 is also provided with an electrical adjustment device 17 visible in FIG. 2 and comprising:

firstly an electric motor and gear box unit 18 e.g. pivotally mounted in full or in part on a cross-bar 19 interconnecting the two moving bars 7 of the base, said motor unit driving a wormscrew 20 as a function of actuation of the above-mentioned control button 8; and secondly a nut 21 pivotally mounted on a cross-bar 22 interconnecting the two curved bars 13 and engaged on the wormscrew 20.

Finally, the rigid frame 4a of the seat proper 4 has:

firstly a rear end which is pivotally mounted on the curved bars 13 to pivot about a transverse horizontal axis situated at the bottom of the seat back 5, said axis being defined by two pivots 31; and secondly a front end which is mounted on the base via a link mechanism adapted to impose angular displacements on the seat proper which are less than half the angular displacements to which the seat back is subjected during adjustment of the inclination of said seat back.

Advantageously, the angular displacements of the seat proper lie in the range 20% to 40% of the angular displacements to which the seat back is subjected during adjustment of the inclination of said seat back.

The link mechanism in question may optionally consist in pivots or wheels carried by the front end of the frame 4a and sliding in grooves secured to the base.

The link mechanism could also be of the "Chebyshev linkage" type, comprising on each side of the seat, three rigid links, namely:

a first link whose bottom end is hinged to the base;

a second link whose bottom end is also hinged to the base, the first and second links crossing each other without being mechanically interconnected at any intermediate point along their length; and a third link whose two ends are hinged to the respective top ends of the first and second links, said third link having a pivot substantially in the middle thereof which is itself hinged to the frame 4a of the seat proper at the front end of the frame, so that said front end moves substantially horizontally during adjustment of the inclination of the seat back.

In the example under consideration, this linkage consists in two rigid links 23 each having a first pivot 24 connected to one of the lugs 16 and a second pivot 25 connected to the frame 4a of the seat proper towards the front end of the seat proper.

The second pivot 25 is disposed above the first pivot 24, and these two pivots are preferably aligned on a direction that makes an angle of less than 20° with the vertical.

By means of these dispositions, when the seat back passes from a position in which it is inclined to a small extent, as shown in FIG. 4, to a position in which it is inclined to a greater extent, as shown in FIG. 5, the rear end of the seat proper 4 tracks the displacement of the seat back, so that no gap is created between the seat proper and the seat back, and nor is there any interference between the seat proper and the seat back, while the front end of the seat proper is subjected to displacement of relatively small amplitude and the inclination of the seat proper varies little, such that the user of the seat continually retains an ergonomic position without any need to readjust the position of the slides of the base 2.

Figure 6:
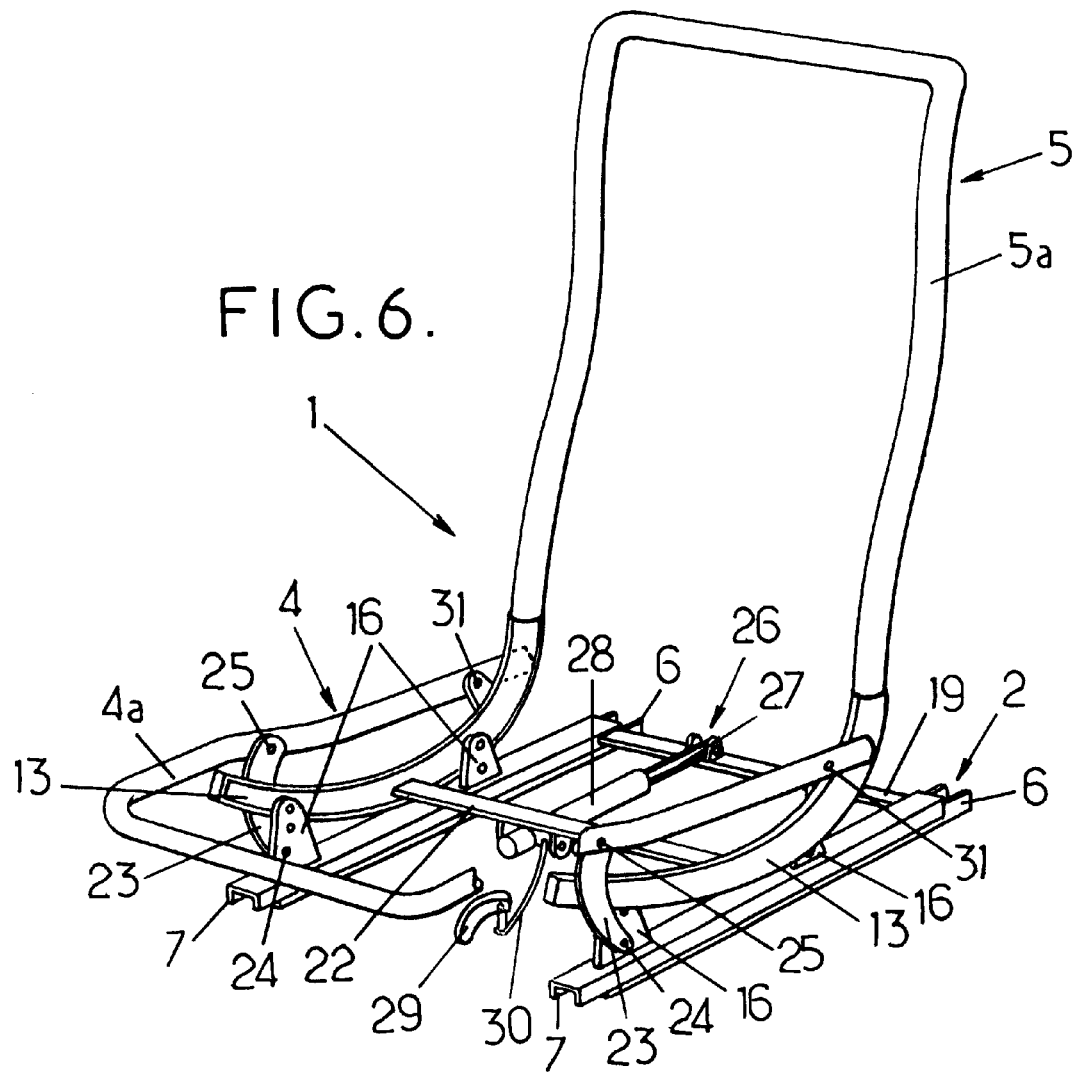
FIG. 6 is a view similar to FIG. 2 showing an adjustment device constituting a second embodiment of the invention.

In a variant, the electrical adjustment device 17 can be replaced by a mechanical device 26 as shown in FIG. 6, the mechanical adjustment device comprising:

a rod 27 pivotally mounted on the cross-bar 19 of the base; and a locking device 28 pivotally mounted on the cross-bar 22 secured to the curved bars 13, said locking device 28 being adapted to lock automatically on the rod 27, and said locking device being capable of being unlocked by actuating a handle 29 which is accessible on the side of the seat proper and which is connected to the locking device 28 via a sheathed cable 30 or some other link device.

The locking device 28 may, for example, be of the type disclosed in document U.S. Pat. No. 3,874,480.

I claim:

1. A vehicle seat comprising a base designed to be mounted on a floor of a vehicle, together with a seat proper and a seat back supported by the base, the seat back being pivotally mounted on the base to pivot about a transverse horizontal axis of rotation so that a user can adjust the inclination of said seat back with help of adjustment means, the seat proper extending between a front end and a rear end and having a top face for supporting the user, said seat proper having a mean plane which is substantially parallel to said top face, the seat back having a front face for supporting the user, and said seat back also having a mean plane which is substantially parallel to said front face, the seat having a longitudinal midplane which is perpendicular to the mean planes of the seat proper and of the seat back, the axis of rotation of the seat back being situated in front of the seat back at a first distance from the front face of said seat back as measured in the midplane of the seat parallel to the mean plane of the seat proper, and the axis of rotation of the seat back being situated above the seat proper, at a second distance from the top face of said seat proper as measured in the midplane of the seat parallel to the mean plane of the seat back, the seat being characterized in that the rear end of the seat proper is pivotally mounted on an element secured to the seat back and is supported by said element, and in that the front end of the seat proper is mounted on the base via a linkage adapted to impose angular displacements on the seat proper that are less than half the angular displacements to which the seat back is subjected during adjustment of the inclination of said seat back;

wherein the linkage comprises at least one rigid link having a first pivot connected to the base and a second pivot connected to the seat proper, the second pivot being situated above the first pivot; and wherein the first and second pivots are aligned on a direction that forms an angle of less than 20° relative to vertical.

2. A seat according to claim 1, in which the linkage is adapted to impose angular displacements on the seat proper lying in a range 20% to 40% of the angular displacements to which the seat back is subjected during adjustment of the inclination of said seat back.

3. A seat according to claim 1, in which the adjustment means comprise a rod associated with a locking device which is adapted to lock on the rod, one of said rod and said locking device being connected to the base, and the other to the seat back.

4. A seat according to claim 1, in which the first distance lies in a range 8 cm to 20 cm and the second distance lies in a range 15 cm to 25 cm.

5. A seat according to claim 1, in which the first distance lies in a range 3 cm to 25 cm and the second distance lies in a range 10 cm to 30 cm.

6. A vehicle seat comprising a base designed to be mounted on a floor of a vehicle, together with a seat proper and a seat back supported by the base, the seat back being pivotally mounted on the base to pivot about a transverse horizontal axis of rotation so that a user can adjust the inclination of said seat back with help of adjustment means, the seat proper extending between a front end and a rear end and having a top face for supporting the user, said seat proper having a mean plane which is substantially parallel to said top face, the seat back having a front face for supporting the user, and said seat back also having a mean plane which is substantially parallel to said front face, the seat having a longitudinal midplane which is perpendicular to the mean planes of the seat proper and of the seat back, the axis of rotation of the seat back being situated in front of the seat back at a first distance from the front face of said seat back as measured in the midplane of the seat parallel to the mean plane of the seat proper, and the axis of rotation of the seat back being situated above the seat proper, at a second distance from the top face of said seat proper as measured in the midplane of the seat parallel to the mean plane of the seat back, the seat being characterized in that the rear end of the seat proper is pivotally mounted on an element secured to the seat back and is supported by said element, and in that the front end of the seat proper is mounted on the base via a linkage adapted to impose angular displacements on the seat proper that are less than half the angular displacements to which the seat back is subjected during adjustment of the inclination of said seat back;

wherein the adjustment means comprise a wormscrew which is driven by an electric motor and which meshes with a nut, one of said screw and said nut being connected to the base, and the other to the seat back.

7. A vehicle seat comprising a base designed to be mounted on a floor of a vehicle, together with a seat proper and a seat back supported by the base, the seat back being pivotally mounted on the base to pivot about a transverse horizontal axis of rotation so that a user can adjust the inclination of said seat back with help of adjustment means, the seat proper extending between a front end and a rear end and having a top face for supporting the user, said seat proper having a mean plane which is substantially parallel to said top face, the seat back having a front face for supporting the user, and said seat back also having a mean plane which is substantially parallel to said front face, the seat having a longitudinal midplane which is perpendicular to the mean planes of the seat proper and of the seat back, the axis of rotation of the seat back being situated in front of the seat back at a first distance from the front face of said seat back as measured in the midplane of the seat parallel to the mean plane of the seat proper, and the axis of rotation of the seat back being situated above the seat proper, at a second distance from the top face of said seat proper as measured in the midplane of the seat parallel to the mean plane of the seat back, the seat being characterized in that the rear end of the seat proper is pivotally mounted on an element secured to the seat back and is supported by said element, in that the front end of the seat proper is mounted on the base via a linkage adapted to impose angular displacements on the seat proper that are less than half the angular displacements to which the seat back is subjected during adjustment of the inclination of said seat back; and the seat back has a rigid frame which is extended forwards and downwards by two circularly-arcuate curved bars, said curved bars extending on either side of the seat proper in vertical planes parallel to said midplane and each having a center of curvature situated on the axis of rotation of the seat back, and said curved bars slide longitudinally in guides belonging to the base to enable the seat back to pivot.

8. A seat according to claim 7, in which each of the guides in which the curved bars slide comprise a plurality of pairs of wheels, the two wheels in each pair being disposed respectively above and below at least one rigid flange belonging to the corresponding curved bar and extending perpendicularly to the midplane of the seat.

* * * * *